(12) United States Patent
Stamm et al.

(10) Patent No.: US 6,618,403 B2
(45) Date of Patent: Sep. 9, 2003

(54) METHOD AND APPARATUS FOR COMPENSATION OF BEAM PROPERTY DRIFTS DETECTED BY MEASUREMENT SYSTEMS OUTSIDE OF AN EXCIMER LASER

(75) Inventors: Uwe Stamm, Goettingen (DE); Hans-Stephan Albrecht, Goettingen (DE); Guenter Nowinsk, Unterwellenborn (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/811,354

(22) Filed: Mar. 16, 2001

(65) Prior Publication Data

US 2001/0042840 A1 Nov. 22, 2001

Related U.S. Application Data

(60) Provisional application No. 60/189,729, filed on Mar. 16, 2000, and provisional application No. 60/223,070, filed on Aug. 4, 2000.

(51) Int. Cl.⁷ .................................................. H01S 3/13
(52) U.S. Cl. ................. 372/29.021; 372/55; 372/29.02; 372/38.01
(58) Field of Search ..................... 372/29.021, 29.02, 372/38.01, 38.1, 55, 57; 355/67; 250/492.2

(56) References Cited

U.S. PATENT DOCUMENTS

| | | | |
|---|---|---|---|
| 3,806,829 A | 4/1974 | Duston et al. ............. 331/94.5 |
| 4,611,270 A | 9/1986 | Klauminzer et al. ........ 364/183 |
| 4,616,908 A | 10/1986 | King .......................... 350/576 |
| 4,674,099 A | 6/1987 | Turner ......................... 372/59 |
| 4,829,536 A | 5/1989 | Kajiyama et al. ............. 372/57 |
| 4,856,018 A | 8/1989 | Nozue et al. .................. 372/98 |
| 4,860,300 A | 8/1989 | Baumler et al. .............. 372/57 |
| 4,905,243 A | 2/1990 | Lokai et al. ................... 372/32 |
| 4,975,919 A | 12/1990 | Amada et al. ................. 372/33 |
| 4,997,573 A | 3/1991 | Browne ....................... 210/714 |
| 5,095,492 A | 3/1992 | Sandstrom ................... 372/102 |
| 5,097,291 A | 3/1992 | Suzuki ......................... 355/69 |
| 5,140,600 A | 8/1992 | Rebhan ........................ 372/25 |
| 5,142,543 A | 8/1992 | Wakabayashi et al. ........ 372/32 |
| 5,221,823 A | 6/1993 | Usui ....................... 219/121.78 |
| 5,396,514 A | 3/1995 | Voss ............................ 372/57 |
| 5,404,366 A | 4/1995 | Wakabayashi et al. ........ 372/29 |
| 5,463,650 A | 10/1995 | Ito et al. ....................... 372/57 |
| 5,559,584 A | 9/1996 | Miyaji et al. ................. 355/73 |

(List continued on next page.)

FOREIGN PATENT DOCUMENTS

WO    WO 97/07926    3/1997    .......... B23K/26/00

*Primary Examiner*—Albert W. Paladini
(74) *Attorney, Agent, or Firm*—Stallman & Pollock LLP

(57) ABSTRACT

A lithography laser system for incorporating with a semiconductor processing system includes a discharge chamber filled with a laser gas including molecular fluorine and a buffer gas, multiple electrodes within the discharge chamber and connected with a discharge circuit for energizing the laser gas, a resonator including the discharge chamber for generating a laser beam, and a processor. The processor runs an energy control algorithm and sends a signal to the discharge circuit based on said algorithm to apply electrical pulses to the electrodes so that the laser beam exiting the laser system has a specified first energy distribution over a group of pulses. The energy control algorithm is based upon a second energy distribution previously determined of a substantially same pattern of pulses as the group of pulses having the first energy distribution. The second energy distribution is determined for the laser beam at a location after passing the beam through beam shaping optical elements of the semiconductor processing system while a value of the energy of the laser beam exiting the laser system is maintained at an approximately constant first energy.

20 Claims, 4 Drawing Sheets

U.S. PATENT DOCUMENTS

| | | | |
|---|---|---|---|
| 5,596,596 A | 1/1997 | Wakabayashi et al. | 372/102 |
| 5,657,334 A | 8/1997 | Das et al. | 372/33 |
| 5,684,822 A | 11/1997 | Partlo | 372/95 |
| 5,710,787 A | 1/1998 | Amada et al. | 372/25 |
| 5,729,565 A | 3/1998 | Meller et al. | 372/87 |
| 5,761,236 A | 6/1998 | Kleinschmidt et al. | 372/100 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 6,005,879 A | 12/1999 | Sandstrom et al. | 372/25 |
| 6,005,880 A | 12/1999 | Basting et al. | 372/38 |
| 6,008,497 A | 12/1999 | Mizoguchi et al. | 250/492.1 |
| 6,020,723 A | 2/2000 | Desor et al. | 320/166 |
| 6,067,306 A | 5/2000 | Sandstrom et al. | 372/38 |
| 6,084,897 A | 7/2000 | Wakabayashi et al. | 372/38 |
| 6,128,323 A * | 10/2000 | Myers et al. | 372/38.1 |
| 6,141,081 A | 10/2000 | Das et al. | 355/53 |
| 6,157,662 A | 12/2000 | Scaggs et al. | 372/60 |
| 6,160,832 A | 12/2000 | Kleinschmidt et al. | 372/57 |
| 6,320,892 B1 * | 11/2001 | Padmabandu et al. | 372/57 |
| 6,392,743 B1 * | 5/2002 | Zambon et al. | 372/57 |
| 6,455,862 B1 * | 9/2002 | Van Der Veen et al. | 250/492.2 |

\* cited by examiner

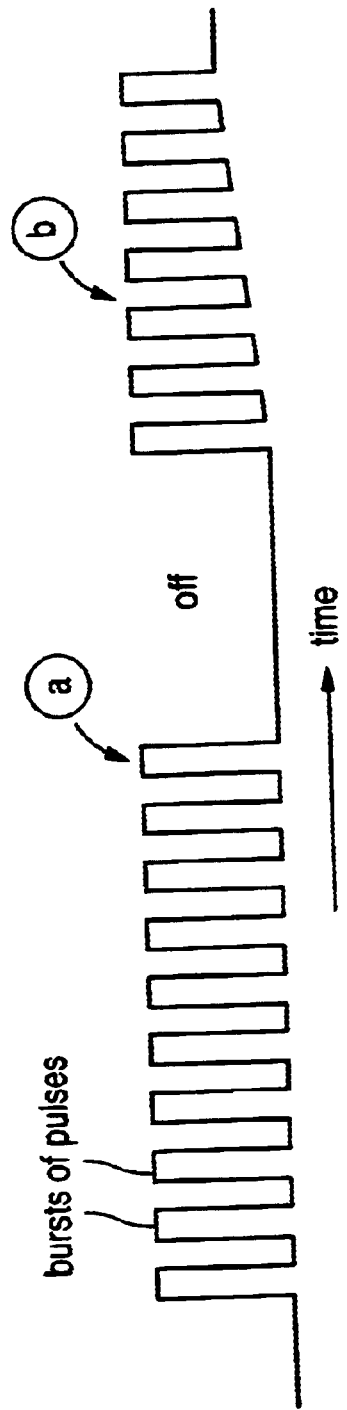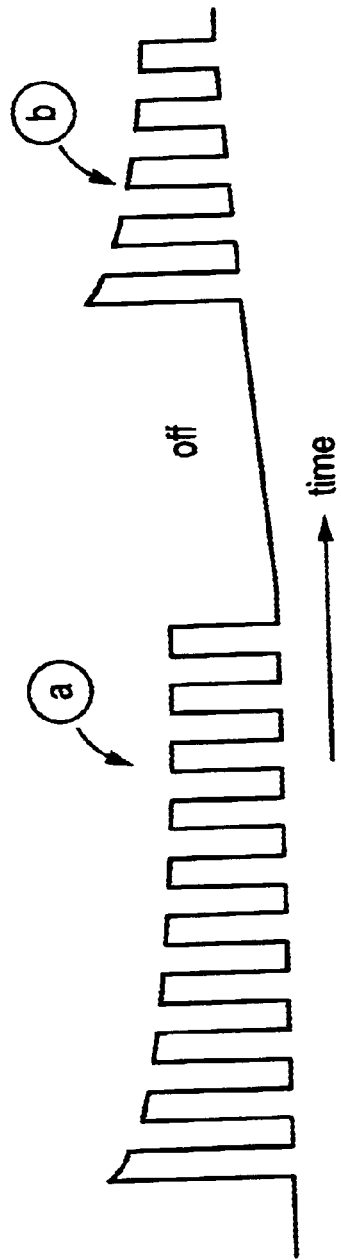

METHOD AND APPARATUS FOR COMPENSATION OF BEAM PROPERTY DRIFTS DETECTED BY MEASUREMENT SYSTEMS OUTSIDE OF AN EXCIMER LASER

PRIORITY

This application claims the benefit of priority to U.S. provisional applications No. 60/189,729, filed Mar. 16, 2000, and No. 60/223,070, filed Aug. 4, 2000.

BACKGROUND OF THE INVENTION

1. Field of the Invention

The invention relates to an energy stabilization method for a lithography laser, and particularly to a method for compensating energy transients at a workpiece in a laser output energy control algorithm.

2. Discussion of the Related Art

Excimer lasers are typically used for industrial applications in combination with processing systems. Such systems can be lithography wafer scanners or TFT-annealing-systems for example. Typically these laser systems have internal detectors to measure certain laser parameters. These laser parameters can include pulse energy, pulse energy dose over a certain number of pulses, spatial beam profile in a plane of the processing system, temporal pulse duration or one or more additional laser beam parameters.

The excimer laser system used for those applications has normally on board metrology measurement tools which allow the measurement and stabilization of similar parameters of the laser beam as pulse energy, pulse energy dose and so on. Under real conditions the detectors used in the on board metrology and the detectors used in the processing tool may measure and/or exhibit different characteristics. For example, detectors in the processing tool may be polarization sensitive, while detectors in the laser system may be not sensitive to the polarization of the incident light.

In addition, the path of the beam between the laser beam detector and the detector of the processing tool may include such optics as an aperture, such that an intensity difference between the detectors may vary with the beam profile or beam width. Such variance may occur as a result of a beam divergence varying over time such as may depend on the structure of the burst sequencing. For example, a beam divergence may be greater during or after prolonged burst periods as compared to periods of reduced exposure due to heating of optics or changes in the gas mixture temperature and/or composition.

SUMMARY OF THE INVENTION

In view of the above, a lithography laser system for incorporating with a semiconductor processing system is provided including a discharge chamber filled with a laser gas including molecular fluorine and a buffer gas, multiple electrodes within the discharge chamber and connected with a discharge circuit for energizing the laser gas, a resonator including the discharge chamber for generating a laser beam, and a processor. The processor runs an energy control algorithm and sends a signal to the discharge circuit based on said algorithm to apply electrical pulses to the electrodes so that the laser beam exiting the laser system has a specified first energy distribution over a group of pulses. The energy control algorithm is based upon a second energy distribution previously determined of a substantially same pattern of pulses as the group of pulses having the first energy distribution. The second energy distribution is determined for the laser beam at a location after passing the beam through beam shaping optical elements of the semiconductor processing system while a value of the energy of the laser beam exiting the laser system is maintained at an approximately constant first energy.

In further view of the above, the laser beam energy exiting the laser is determined to change according to the second energy distribution as a result of passing through said beam shaping optical elements. The beam exiting the laser has the substantially constant first energy over the group of pulses being transformed to the beam after the beam shaping optical elements having the second energy distribution over the group of pulses. The first energy distribution may be determined substantially as the approximately constant first energy minus the second energy distribution, within a steady-state linear energy reduction multiple of the second energy distribution between the beam exiting the laser and the beam after the beam shaping optics.

The first energy distribution may have the form:

$E_{laser}(t) = E_0 - KF(t)$, where K is a constant, F(t) is a function of time and the second energy distribution has a form $E(t) = E_1 + F(t)$, where $E_1$ is a desired energy of the beam after the beam shaping optics, and $E_0$ is the first energy of said beam exiting the laser, which first energy $E_0$ is sufficient to produce the desired energy $E_1$ after the beam shaping optics when the laser is operating in steady state. The constant K may be $E_1/E_0$. The function F(t) may be $Ae_{-(t/\tau)}$, wherein A is a magnitude of a transient overshoot, t is a time and $\tau$ is a time constant. In addition, the first energy distribution may be used in the energy control algorithm for a predetermined time after a long burst pause, after which the laser beam exiting said laser is maintained at the substantially constant first energy.

In further view of the above, a method for stabilizing a laser beam energy at a location after beam shaping optical elements of a semiconductor fabrication system is provided including generating a laser beam and passing the beam through the beam shaping optical elements. A first energy distribution is determined of the laser beam at a location after passing through the beam shaping optical elements over a burst pattern including a group of laser pulses while the laser beam is maintained at an approximately constant first energy. The processor is programmed with an energy control algorithm based on the first energy distribution. Electrical pulses are applied to discharge electrodes of the laser system based on the energy control algorithm such that the laser beam exiting the laser system has a second energy distribution over the burst pattern including the group of pulses, such that an energy of the beam at the location after the beam shaping optics is controlled to be substantially a desired constant second energy.

The laser beam energy exiting the laser may be determined to change according to the second energy distribution as a result of passing through the beam shaping optical elements. The beam exiting the laser may have the substantially constant first energy over the group of pulses and be transformed to the beam after the beam shaping optical elements and have the second energy distribution over the group of pulses.

The applying step may include determining the first energy distribution substantially as the approximately constant first energy minus the second energy distribution, within a steady-state linear energy reduction multiple of the second energy distribution between the beam exiting the laser and the beam after the beam shaping optics.

The second energy distribution may have the form: $E_{laser}(t)=E_0-KF(t)$, wherein K is an constant, F(t) is a function of time, and the second energy distribution has a form $E(t)=E_1+F(t)$, wherein $E_1$ is the second energy and $E_0$ is the first energy, which first energy $E_0$ is sufficient to produce the desired energy $E_1$ after the beam shaping optics when the laser is operating in steady state. F(t) may be $Ae^{-(t/\tau)}$, wherein A is a magnitude of a transient overshoot, t is a time and $\tau$ is a time constant.

BRIEF DESCRIPTION OF THE DRAWINGS

FIG. 2 shows a qualitative, exemplary plot of a signal measured by an internal energy stabilization loop detector of the laser system of FIG. 1.

FIG. 3 shows a qualitative, exemplary plot of a signal measured by a detector positioned after optical elements of a wafer processing tool.

INCORPORATION BY REFERENCE

What follows is a cite list of references each of which is, in addition to those references cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

U.S. Pat. Nos. 5,710,787, 5,463,650, 6,008,497, 5,657,334, 6,005,879, 4,611,270, 3,806,829, 6,141,081, 6,084,897, 4,997,573, 5,097,291, 5,140,600 and 4,674,099; and U.S. patent application Ser. Nos. 09/498,121, 09/688,561, and 09/780,120, U.S. published application No. 20020012374, and U.S. Pat. Nos. 6,212,24, 6,490,307, 6,243,406, 6,243,405, and 6,389,052, each of which is assigned to the same assignee as the present application.

DETAILED DESCRIPTION OF THE PREFERRED EMBODIMENTS

Figure 1:
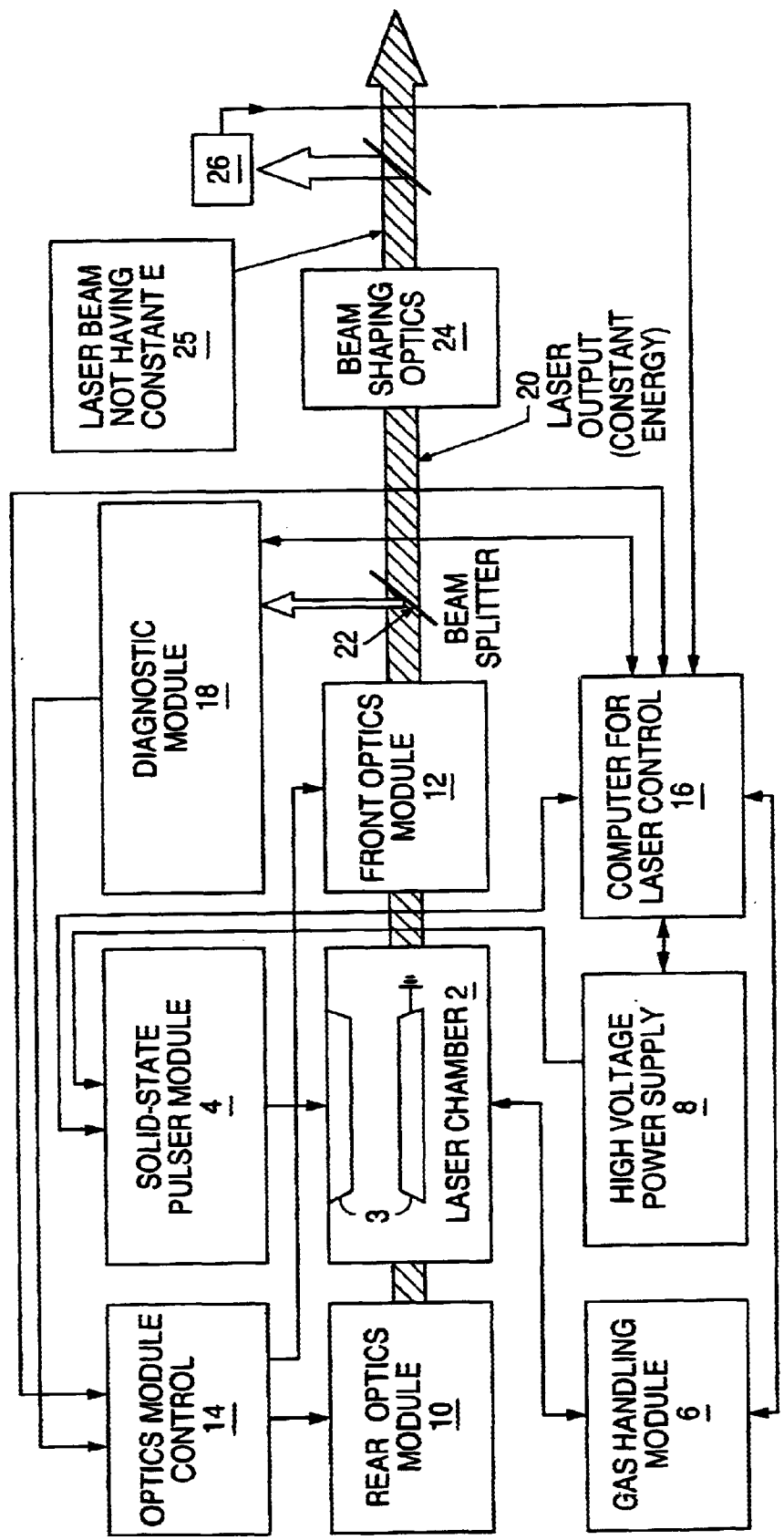
FIG. 1 schematically shows a laser system configuration according to a preferred embodiment for receiving information relating to beam transformation between exiting the laser resonator and after passing through optical elements of a wafer processing tool.

FIG. 1 schematically shows a lithography laser system such as a KrF, ArF or $F_2$ laser system in accord with a preferred embodiment, except that an energy control algorithm is set for constant laser beam energy for the beam exiting the laser rather than after the beam shaping optics 24, as is preferred and described in more detail below with respect to FIG. 4. In general, the system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown including the discharge chamber 2, a rear optics module 10 and a front optics module 12. An optics control module 14 communicates with the rear and front optics modules 10, 12. A computer or processor 16 controls various aspects of the laser system. A diagnostic module 18 receives a portion of the output beam 20 from a beam splitter 22.

The gas mixture in the laser chamber 2 typically includes about $0.1\%F_2$, 1.0%Kr and 98.9% buffer gas for a KrF laser, $0.1\%F_2$, 1.0%Ar and 98.9% buffer gas for an ArF laser, and $0.1\% F_2$ and 99.9% buffer gas for the $F_2$ laser. The buffer gas preferably comprises neon for the KrF laser, neon and or helium for the ArF laser, and helium and/or neon for the $F_2$ laser (see U.S. Pat. No. 6,157,662, which is hereby incorporated by reference). A trace amount of a gas additive such as xenon, argon or krypton may be included (see U.S. patent application Ser. No. 09/513,025, which is assigned to the same assignee as the present application and is hereby incorporated by reference).

The gas mixture is preferably monitored and controlled using an expert system (see U.S. patent application Ser. No. 09/379,034, which is assigned to the same assignee as the present application and is hereby incorporated by reference). One or more beam parameters indicative of the fluorine concentration in the gas mixture, which is subject to depletion, may be monitored, and the gas supply replenished accordingly (see U.S. patent application Ser. Nos. 09/418,052 and 09/484,818, which are assigned to the same assignee and are hereby incorporated by reference). The diagnostic module 18 may include the appropriate monitoring equipment or a detector may be positioned to receive a beam portion split off from within the laser resonator (see U.S. patent application Ser. No. 60/166,967, which is assigned to the same assignee as the present application and is hereby incorporated by reference). The processor 16 preferably receives information from the diagnostic module 18 concerning the halogen concentration and initiates gas replenishment action such as micro-halogen injections, mini and partial gas replacements, and pressure adjustments by communicating with the gas handling module 6 (see U.S. patent application Ser. Nos. 09/780,120, 09/734,459 and 09/447,882, which are assigned to the same assignee as the present application and are hereby incorporated by reference).

Although not shown, the gas handling module 6 has a series of valves connected to gas containers external to the laser system. The gas handling module 6 may also include an internal gas supply such as a halogen and/or xenon supply or generator (see the '025 application). A gas compartment or (not shown) may be included in the gas handling module 6 for precise control of the micro halogen injections (see the '882 application and U.S. Pat. No. 5,396,514, which is hereby incorporated by reference).

The wavelength and bandwidth of the output beam 20 are also preferably monitored and controlled. A preferred wavelength calibration apparatuses and procedures are described at U.S. Pat. Nos. 6,160,832, 4,905,243 and U.S. patent application Ser. No. 60/202,564, which are assigned to the same assignee and are hereby incorporated by reference. The monitoring equipment may be included in the diagnostic module 18 or the system may be configured to outcouple a beam portion elsewhere such as from the rear optics module, since only a small intensity beam portion is typically used for wavelength calibration. The diagnostic module 18 may be integrated with the front optics module 12, and the line-narrowing components of the resonator may be integrated in the front optics module 12, as well, such that only a HR mirror and an optional aperture are included in the rear optics module 10.

Preferred main electrodes 3 are described at U.S. Pat. No. 6,466,599, which is each assigned to the same assignee as the present application and is hereby incorporated by reference. Other electrode configurations are set forth at U.S. Pat. Nos. 5,729,565 and 4,860,300, each of which is hereby incorporated by reference. Preferred preionization units are set forth at U.S. patent application Ser. Nos. 09/247,887 and 09/692,265, each of which is assigned to the same assignee as the present application and is hereby incorporated by reference. The preferred solid state pulser module 4 and the high voltage power supply 8 are set forth at U.S. Pat. Nos. 6,020,723, 6,005,880, 6,226,307 and 6,198,761, each of which is assigned to the same assignee as the present application and is hereby incorporated by reference into the present application.

The resonator includes optics for line-selection and also preferably for narrowing the selected line (see U.S. Pat. Nos. 6,345,065, 6,154,470, 6,426,966, 6,381,256, 6,285,701, 6,393,037, and 6,061,382 and U.S. patent application Nos. 60/212,193, 60/170,342, 60/166,967, 60/170,919, 09/584, 420,60/212,257, 60/212,301, 60/215,933, 60/124,241, 60/140,532, 60/140,531, and 60/147,219, each of which is assigned to the same assignee as the present application, and U.S. Pat. Nos. 5,761,236 and 5,946,337, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference). Some of the line selection and/or line narrowing techniques set forth in these patents and patent applications may be used in combination with or alternative to any of the embodiments set forth herein.

Also, and particularly for the F2 and ArF laser systems, an enclosure (not shown) may seal the beam path of the beam 20 such as to keep the beam path free of photoabsorbing species. Smaller enclosures may seal the beam path between the chamber 2 and the optics modules 10 and 12. Preferred enclosures are described in detail in U.S. Pat. Nos. 6,219, 368, 6,442,182, 6,327,290, 6,399,916 and U.S. published application no. 20010028664, each of which is assigned to the same assignee and is hereby incorporated by reference, and alternative configuration are set forth at U.S. Pat. Nos. 5,559,584, 5,221,823, 5,763,855, 5,811,753 and 4,616,908, all of which are hereby incorporated by reference.

The beam 20 exiting the laser system is shown as being stabilized at constant output energy. When the laser system is used in a wafer fabrication system for photolithography, the beam traverses beam-shaping optics 24 that form the beam. The beam-shaping optics 24 typically include an aperture and other optical elements. It is recognized in the present invention that the beam 20 having constant energy may be transformed as it passes through the beam shaping optics 24, such that the beam 25 after the beam shaping optics no longer exhibits a constant energy. For example, an aperture of the beam shaping optics 24 may clip off a varying amount of energy as the divergence of the beam 20 changes with a varying degree of heating of the optics of the laser resonator.

The processor controls the laser to output laser pulses in bursts of many pulses followed by short pauses corresponding to the processing of a semiconductor chip followed by the stepping of the wafer fabrication tool to a different chip. Several of these bursts followed by short pauses may be generated. At certain points, long pauses wherein no bursts are generated occur while, e.g., a chip on a new sheet or wafer is positioned or another reason. Thus, multiple series of bursts with short pauses in between are followed by long pauses. During these long pauses, optics of the laser system may tend to cool down. The divergence of the laser beam exiting the laser system varies with the heating of the optics, and thus the divergence may change dramatically during long burst pauses, when the optics cool down, and during the series of bursts, when the optics warm back up. This produces a transient as the amount of energy transmitted through the beam shaping optics varies with the divergence. It is, however, the energy of the beam after the beam shaping optics that is desired to remain constant, notwithstanding whether the energy of the beam exiting the laser system varies.

FIG. 2 illustrates the energy of the laser beam as it exits the laser system when the energy stabilizes around a substantially constant energy. For example, an internal detector of the laser system, such as of the diagnostic module 18, may be used for stabilization in a feedback loop with the processor 16 and the power supply 8, after switching on the laser under typical operation conditions. The qualitative plot shows of FIG. 2 shows an output energy of the laser system operating in burst mode, such as has been described above (see also U.S. Pat. Nos. 5,710,787, 5,463,650, 6,008,497, 5,657,334, 6,005,879, and 5,140,600, and U.S. patent application Ser. Nos. 09/498,121, 09/379,034, 09/447,882, 09/418,052, 09/484,818, 09/734,459, 60/178,620, 60/182, 083 and 60/186,011, each application being assigned to the same assignee as the present application, and all of the above patents and patent applications being hereby incorporated by reference into the present application).

FIG. 3 shows the signal after switching on the laser with the same burst sequence as in FIG. 2 measured by a detector in a plane of the processing tool, such as the detector 26 of FIG. 1. It can be seen from the example that the magnitude of the signal measured by the external detector varies over time notwithstanding the fact that the laser has its own stabilization loop. In the example the signal decreases to reach a steady state after a certain time.

The decrease of the signal may be caused by the explanation provided above, the detector of the processing tool, the optical transfer finding of the processing tool, as well as all the optical means in front of the detector. For example, the signal decrease may be caused by changes in the optical characteristics by illumination with the excimer radiation of the components of the processing tool. On the other hand, the decay could be caused by changes of the excimer laser internal optics and reflect a change of the signal which cannot be seen by the internal detector. Such a change could for example be polarization. Similar behavior one would observe if the external detector is polarization sensitive while the internal detector is not sensitive for polarization. As it can be seen by a comparison of FIGS. 2 and 3, after having the laser off for a certain time the relation between the internal signal and the external signal are reproducible (compare the pulses prior to the pause labeled "a" with those after the pause labeled "b", particularly in FIG. 3).

Now, this reproducible relationship is advantageously taken into account in a software algorithm which compensates for the drift measured by the external detector. The result is that the external detector would see a signal that is not varying over time (and would look something like FIG. 2) with the decay described above and shown at FIG. 3.

Figure 4:
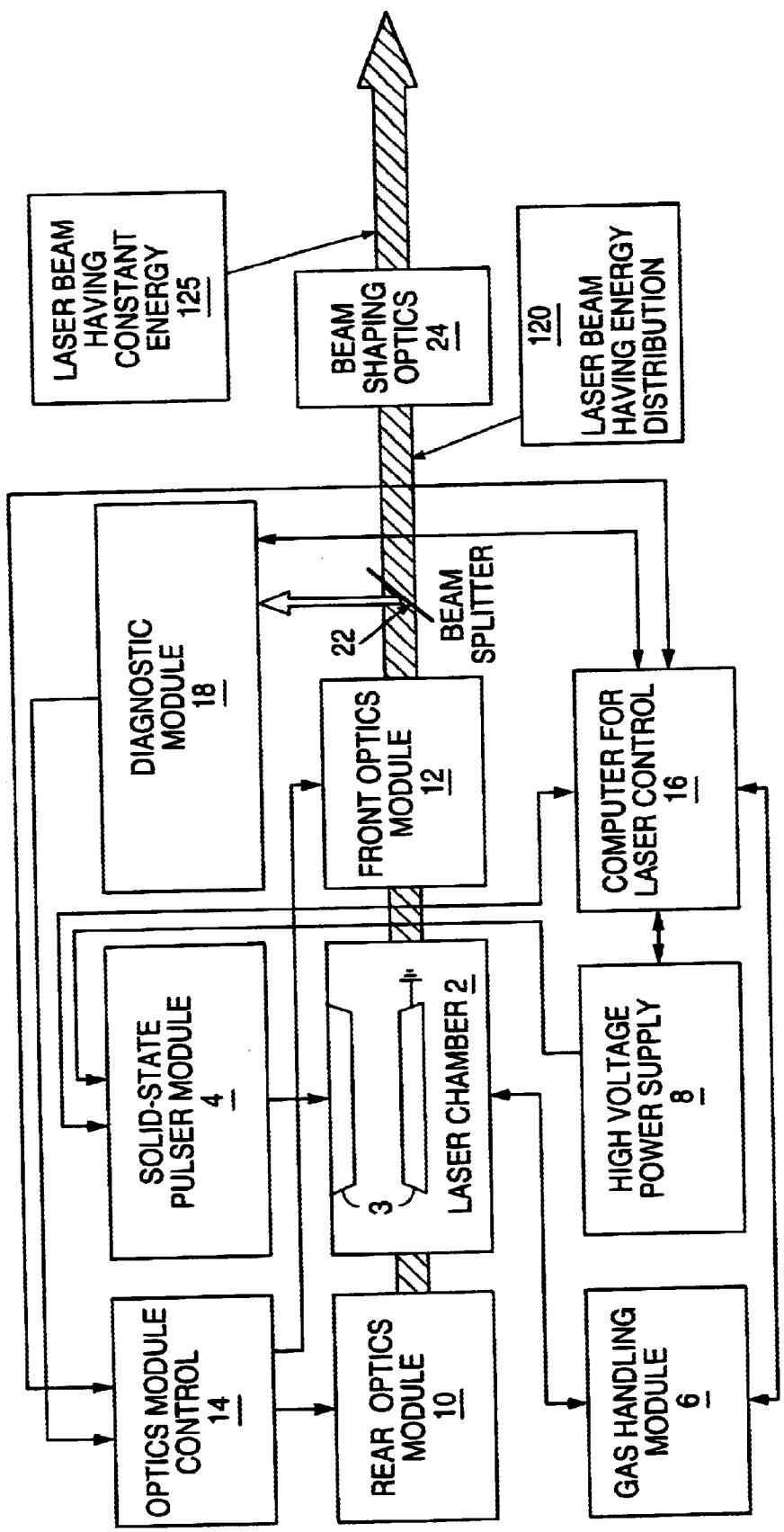
FIG. 4 schematically shows a laser system configuration according to a preferred embodiment for producing an output beam having a substantially constant energy at a position after passing through optical elements of a wafer processing tool.

FIG. 4 illustrates a laser system according to a preferred embodiment wherein the processor is running a software algorithm that programs a function into the internal laser system energy feedback loop, such that the laser beam 120 exiting the laser now has a non-constant energy. The laser beam 125 after the beam shaping optics, however, does have a constant energy.

A function that describes the reduction of the energy of the beam 25 after the beam shaping optics when the laser is configured according to FIG. 1 without the algorithm described with respect to FIG. 4 above, may be an exponential function, for example. In this case the function may look something like:

$E(t) = Ae^{-(t/\tau)} + E_1$, where $\tau$ is the time constant of the exponential decay, A is the amplitude of the overshoot which decays according to the exponential function, and $E_1$ is the desired energy of the beam after the beam shaping optics when the energy has stabilized.

In general, the function would be $E(t) = F(t) + E_1$. When the energy at the detector 26 of FIG. 1 is E(t), the energy of the beam 20 would be substantially constant around $E_0$, as explained above. The algorithm of the preferred embodiment, then is advantageously altered to allow the energy of the beam 120 exiting the laser of FIG. 4 to vary with time in order to have a constant energy for the beam 125 after the beam shaping optics 24 around a desired energy $E_1$, e.g., as follows:

$$E_1 = E(t) - F(t)$$

The energy at the laser is accordingly programmed to be:

$$E_{laser} = E_0 - E_1 F(t) / E_0$$

In the example where $F(t) = Ae^{-(t/\tau)}$, then the energy at the laser is programmed to be:

$E_{laser} = E_0 - (E_1/E_0) Ae^{-(t/\tau)} = E_0 - Ke^{-(t/\tau)}$; where K is an offset constant. It is noted here that other functions may be used to describe the energy distribution after the beam shaping optics 24, such as polynomial distributions, other forms of exponential distributions, e.g., that cutoff after a certain time, such as when the system enters a steady state, or the distribution may be measured and averaged, or otherwise.

Figure 5:
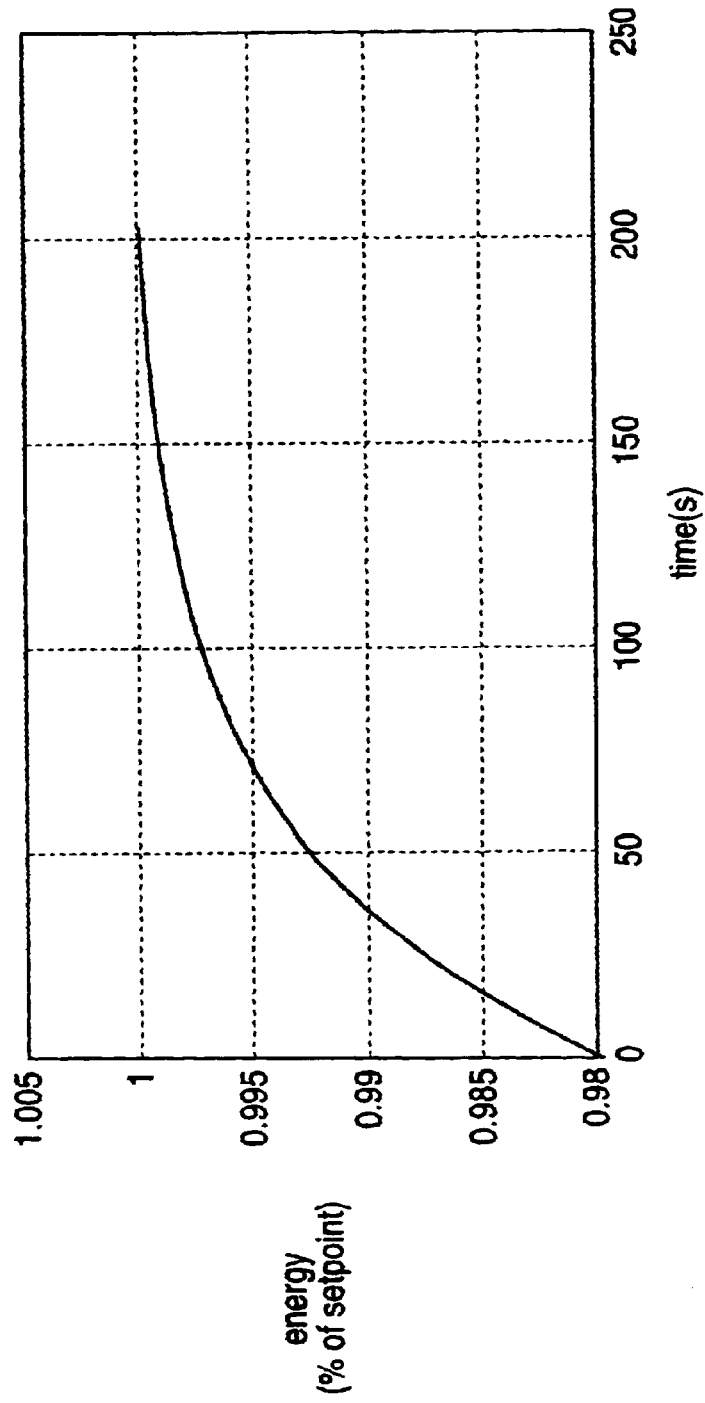
FIG. 5 shows a plot of a function determined from data measured according to the laser system configuration of FIG. 1 and used with an energy control algorithm according to a preferred embodiment for controlling a laser beam output energy to stabilize an energy of the laser beam at a position after passing through optical elements of a wafer processing tool.

FIG. 5 shows an energy versus time graph plotted based on data measured at an internal detector (i.e., to the laser system), when the processor is programmed with the algorithm just described. The energy measured is being controlled in a feedback relationship using the processor 16. The energy of the laser beam is desired to be constant at a workpiece and not necessarily as it exits the laser, such as is measured at the internal detector of the diagnostic module 18 of the laser system. The energy is maintained from the beginning of a burst sequence until some time (e.g., 200 seconds) afterwards according to the burst sequence overshoot algorithm of the preferred embodiment, such that the energy is not constant at the internal detector, as shown, until the steady state is reached (e.g., 200 seconds following a long burst pause). The energy is, however, made to be substantially constant at a workpiece or after the beam shaping optics, as desired, based on the algorithm. The measured energy shown in FIG. 5 was determined to be that energy at the internal detector for a beam such that the beam energy would be constant over the duration shown plotted in FIG. 5 at the external workpiece or after the beam shaping optics 24.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A lithography laser system for incorporating with a semiconductor processing system that includes beam shaping optical elements, comprising:

a discharge chamber filled with a laser gas including molecular fluorine and a buffer gas;

a plurality of electrodes within the discharge chamber and connected with a discharge circuit for energizing the laser gas;

a resonator including the discharge chamber for generating a laser beam, wherein the laser beam exits the laser system and passes through the beam shaping optical elements of the semiconductor processing system; and a processor for running an energy control algorithm and sending a signal to the discharge circuit based on said algorithm to apply electrical pulses to the electrodes so that the laser beam exiting the laser system and before entering the beam shaping optical elements has a specified first energy distribution over a plurality of pulses that results in a substantially constant energy of the laser beam exiting the beam shaping optical elements, and wherein said energy control algorithm is based upon a second energy distribution of the laser beam previously determined of a substantially same pattern of pulses as said plurality of pulses having said first energy distribution, said second energy distribution being determined after the laser beam passes through the beam shaping optical elements while the energy of the laser beam exiting the laser system and entering the beam shaping optical elements is maintained at an approximately constant first energy.

2. The system of claim 1, wherein said first energy distribution has a form:

$E_{laser}(t) = E_0 - KF(t)$, where K is a constant, F(t) is a function of time and said second energy distribution has a form $E(t) = E_1 + F(t)$, and wherein $E_1$ is a desired energy of said beam after said beam shaping optical elements, and $E_0$ is said first energy of said beam exiting said laser, which first energy $E_0$ is sufficient to produce the desired energy $E_1$ after the beam shaping optical elements when the laser is operating in steady state.

3. The system of claim 2, wherein $F(t) = Ae^{-(t/\tau)}$, wherein A is a magnitude of a transient overshoot, t is a time and $\tau$ is a time constant.

4. The system of claim 3, wherein said first energy distribution is used in the energy control algorithm for a predetermined time after a long burst pause, after which said laser beam exiting said laser is maintained at said substantially constant first energy.

5. The system of claim 1, wherein said first energy distribution is used in the energy control algorithm for a predetermined time after a long burst pause, after which said laser beam exiting said laser is maintained at said substantially constant first energy.

6. A lithography laser system for use with a semiconductor processing system, wherein the semiconductor processing system includes beam shaping optical elements separate from and downstream of the laser system, said laser system comprising:
- a discharge chamber filled with a laser gas including molecular fluorine and a buffer gas;
- a plurality of electrodes within the discharge chamber and connected to a discharge circuit for energizing the laser gas;
- a resonator including the discharge chamber for generating a laser beam, wherein the laser beam exits the laser system and passes through the beam shaping optical elements of the semiconductor processing system; and
- control means for sending a signal to the discharge circuit to apply electrical pulses to the electrodes to control the time distribution of output energy of the laser beam so that the energy of a burst of laser pulses exiting the beam shaping optical elements is substantially constant over time.

7. The system of claim 6, wherein the control means includes means for determining how the beam shaping optical elements affects the time distribution of energy of a burst of laser pulses having constant energy output from the laser system and input to the beam shaping optical elements, and for using that determination to compensate for the effect of the beam shaping optical elements by varying the signal to the discharge circuit.

8. The system of claim 6, wherein the control means includes means for determining a time distribution of energy of the burst of laser pulses entering and exiting the beam shaping optical elements.

9. The system of claim 8, wherein the control means includes means for determining the effect of the beam shaping optical elements on the laser beam by comparing the time distribution of energy of the burst of laser pulses entering and exiting the beam shaping optical elements, and wherein the control means compensates for the effect of the beam shaping optical elements by varying the signal to the discharge circuit to adjust the time distribution of energy of the laser beam entering the beam shaping optical elements so that the energy of the laser beam exiting the beam shaping optical elements is substantially constant over time.

10. The system of claim 6, wherein the control means controls the time distribution of output energy of the laser beam for a predetermined time after a long burst pause, after which time the output energy of the laser beam is substantially constant.

11. A lithography laser system for incorporating with a semiconductor processing system that includes beam shaping optical elements, comprising:
- a discharge chamber filled with a laser gas including molecular fluorine and a buffer gas;
- a plurality of electrodes within the discharge chamber and connected to a discharge circuit for energizing the laser gas;
- a resonator including the discharge chamber for generating a laser beam, wherein the laser beam exits the laser system and passes through the beam shaping optical elements of the semiconductor processing system;
- a diagnostic module that monitors the energy of the laser beam as it exits the resonator and before it enters the beam shaping optical elements; and
- a processor coupled to the diagnostic module and the discharge circuit and including means for sending a signal to the discharge circuit to control the energy of the laser beam so that the laser beam exiting the beam shaping optical elements has a substantially constant energy over a plurality of pulses, and
- wherein said means for sending a signal uses a previously determined time distribution of energy of the laser beam measured after the laser beam passes through the beam shaping optical elements while the energy of the laser beam monitored by the diagnostic module before the beam shaping optical elements is maintained at an approximately constant energy.

12. A lithography laser system for use with a semiconductor processing system that includes beam shaping optical elements, said laser system comprising:
- a discharge chamber filled with a laser gas including molecular fluorine and a buffer gas;
- a plurality of electrodes within the discharge chamber and connected to a discharge circuit for energizing the laser gas;
- a resonator including the discharge chamber for generating a laser beam, wherein the laser beam exits the laser system and passes through the beam shaping optical elements of the semiconductor processing system; and
- a processor for running an energy control algorithm and sending a signal to the discharge circuit based on said algorithm to apply electrical pulses to the electrodes so that the laser beam exiting the beam shaping optical elements has a substantially constant energy over a plurality of pulses, and
- wherein said energy control algorithm is based on an energy distribution of the laser beam previously determined of a substantially same pattern of pulses as said plurality of pulses, said energy distribution being determined after the laser beam passes through the beam shaping optical elements while the energy of the laser beam entering the beam shaping optical elements is maintained at an approximately constant energy.

13. A method for stabilizing the energy of a laser beam at a location downstream of beam shaping optical elements of a semiconductor fabrication system, wherein the beam shaping optical elements are separate from and downstream of a laser system that generates the laser beam, wherein the laser system includes laser gas containing molecular fluorine and a buffer gas, and wherein the method comprises the steps of:
- generating a first series of laser pulses having an approximately constant time distribution of energy upstream of the beam shaping optical elements;
- determining how the beam shaping optical elements affects the time distribution of energy of the laser pulses by measuring a time distribution of energy of the first series of laser pulses downstream of the beam shaping optical elements; and
- generating a second series of laser pulses having a time distribution of energy upstream of the beam shaping optical elements that compensates for the effect of the beam shaping optical elements on the energy distribution of the laser beam and results in a substantially constant time distribution of energy of the second series of laser pulses downstream of the beam shaping optical elements.

14. A method for stabilizing the energy of a laser beam at a location downstream of beam shaping optical elements of a semiconductor fabrication system, wherein the beam shaping optical elements are separate from and downstream of a laser system that generates the laser beam, wherein the laser system includes laser gas containing molecular fluorine and a buffer gas, and wherein the method comprises the steps of:

generating a first series of laser pulses having an approximately constant energy upstream of the beam shaping optical elements;

measuring a time distribution of energy of the first series of laser pulses downstream of the beam shaping optical elements; and generating a second series of laser pulses having a time distribution of energy upstream of the beam shaping optical elements that results in a substantially constant time distribution of energy of the second series of laser pulses downstream of the beam shaping optical elements.

15. A method for stabilizing the energy of a laser beam at a location downstream of beam shaping optical elements of a semiconductor fabrication system, wherein the beam shaping optical elements are separate from and downstream of a laser system that generates the laser beam, wherein the laser system includes laser gas containing molecular fluorine and a buffer gas, and wherein the method comprises the steps of:

generating a first series of laser pulses having a substantially constant energy upstream of the beam shaping optical elements;

measuring a time distribution of energy of the first series of laser pulses downstream of the beam shaping optical elements; and controlling the energy of the laser beam upstream of the beam shaping optical elements based on the measured energy of the first series of laser pulses so that the time distribution of energy of the laser beam downstream of the beam shaping optical elements is substantially constant.

16. A method for operating a lithography laser system for use with a semiconductor processing system, wherein the semiconductor processing system includes beam shaping optical elements separate from and downstream of the laser system, wherein the laser system includes a laser gas that includes molecular fluorine and a buffer gas and a controller that controls the output energy of the laser beam, said method comprising the steps of:

controlling the time distribution of output energy of the laser beam upstream of the beam shaping optical elements so that the energy of a burst of laser pulses downstream of the beam shaping optical elements is substantially constant over time.

17. The system of claim 16, wherein the step of controlling includes determining how the beam shaping optical elements affects the time distribution of energy of a burst of laser pulses having constant energy output from the laser system and input to the beam shaping optical elements, and for using that determination to compensate for the effect of the beam shaping optical elements.

18. The system of claim 16, wherein the step of controlling includes determining a time distribution of energy of the burst of laser pulses entering and exiting the beam shaping optical elements.

19. The system of claim 18, wherein the step of controlling includes determining the effect of the beam shaping optical elements on the laser beam by comparing the time distribution of energy of the burst of laser pulses entering and exiting the beam shaping optical elements, and compensating for the effect of the beam shaping optical elements by adjusting the time distribution of energy of the laser beam entering the beam shaping optical elements so that the energy of the laser beam exiting the beam shaping optical elements is substantially constant over time.

20. The system of claim 16, wherein the step of controlling occurs for a predetermined time after a long burst pause, after which time the output energy of the laser beam is substantially constant.

* * * * *